United States Patent
Haas et al.

(10) Patent No.: US 9,370,192 B2
(45) Date of Patent: Jun. 21, 2016

(54) METHOD AND DEVICE FOR PRODUCING WAFFLE SANDWICH BLOCKS

(75) Inventors: Johannes Haas, Vienna (AT); Josef Haas, Leobendorf (AT); Karl Haderer, Ziersdorf (AT); Stefan Jiraschek, Königsbrunn (AT); Jürgen Reithner, Schönberg am Kamp (AT); Leopold Schiessbühl, Göllersdorf (AT); Gerhard Schuhleitner, Limberg (AT)

(73) Assignee: Haas Food Equipment GmbH, Vienna (AT)

( * ) Notice: Subject to any disclaimer, the term of this patent is extended or adjusted under 35 U.S.C. 154(b) by 150 days.

(21) Appl. No.: 14/116,799

(22) PCT Filed: May 3, 2012

(86) PCT No.: PCT/EP2012/058135
§ 371 (c)(1),
(2), (4) Date: Jan. 3, 2014

(87) PCT Pub. No.: WO2012/152653
PCT Pub. Date: Nov. 15, 2012

(65) Prior Publication Data
US 2014/0295043 A1    Oct. 2, 2014

(30) Foreign Application Priority Data

May 11, 2011    (AT) .................................. A 669/2011

(51) Int. Cl.
*A21C 15/02*    (2006.01)

(52) U.S. Cl.
CPC ...................................... *A21C 15/02* (2013.01)

(58) Field of Classification Search
CPC ....... A23G 9/286; A21C 15/002; A21C 15/00
See application file for complete search history.

(56) References Cited

U.S. PATENT DOCUMENTS

| 2,853,961 | A | 9/1958 | Oakes |
| 2,910,017 | A | 10/1959 | Oakes |
| 3,828,660 | A | 8/1974 | Mueller et al. |
| 6,190,714 | B1 | 2/2001 | Haas et al. |

FOREIGN PATENT DOCUMENTS

| DE | 2214719 B1 | 5/1973 |
| GB | 1099019 A | 1/1968 |
| GB | 1420937 | 1/1976 |

*Primary Examiner* — Jianying Atkisson
(74) *Attorney, Agent, or Firm* — Laurence A. Greenberg; Werner H. Stemer; Ralph E. Locher

(57) ABSTRACT

A device and a method produce multi-layered wafer blocks filled with a spreadable mixture such as a cream. A wafer base sheet coated with a spreadable mixture is transported along a first conveyor surface to a stacking area. A wafer cover sheet is transported along a second conveyor surface to the same stacking area. The wafer cover sheet is laid flat on the coated side of the wafer base sheet in the stacking area, and then the wafer base sheet and the wafer cover sheet are transported away together. The wafer cover sheet and wafer base sheet are moved respectively in the stacking area at a speed that is different from zero at all moments.

16 Claims, 5 Drawing Sheets

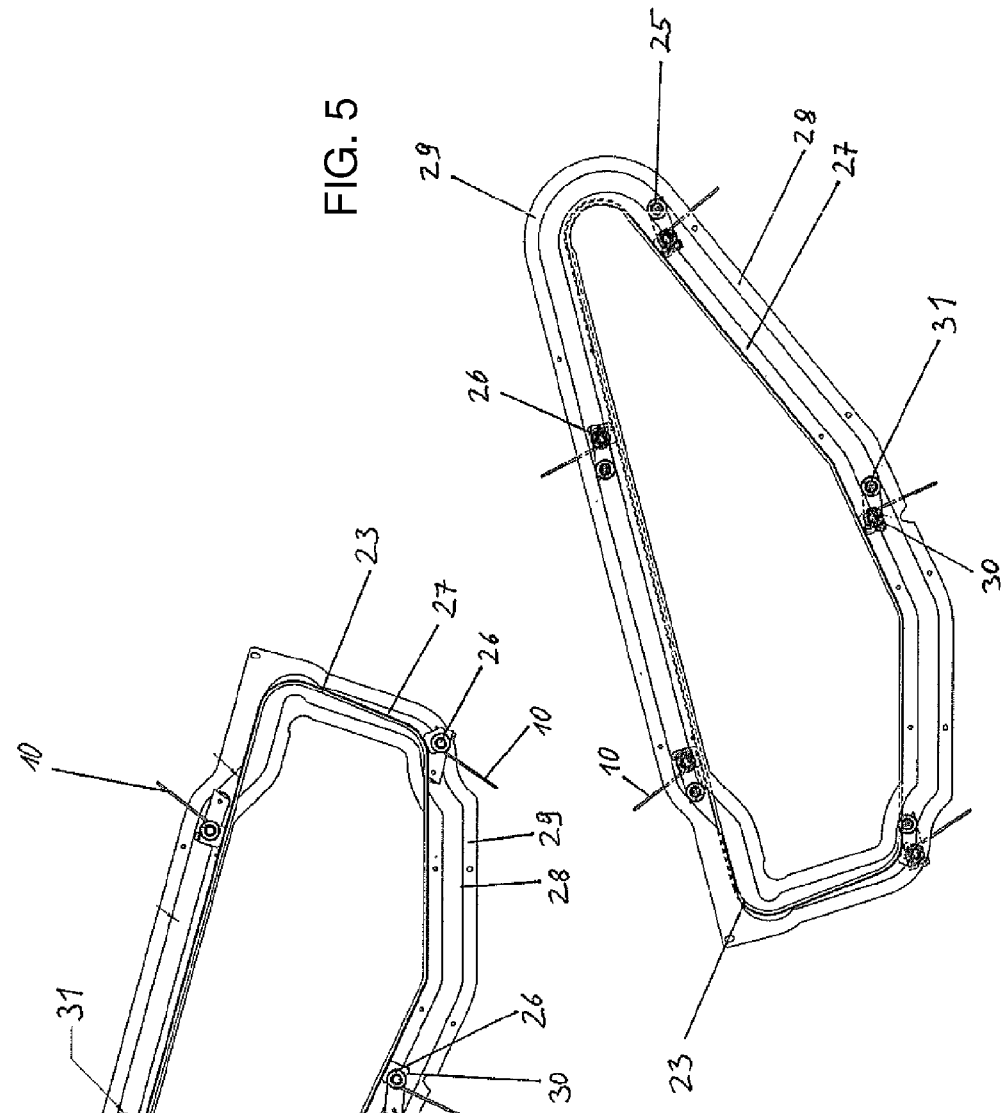

METHOD AND DEVICE FOR PRODUCING WAFFLE SANDWICH BLOCKS

BACKGROUND OF THE INVENTION

Field of the Invention

The invention relates to an apparatus and a method for producing multilayer wafer blocks filled with a coating mass such as, for example, a cream in which a wafer base sheet coated with a coating mass is transported along a first conveying surface to a stacking area, a wafer cover sheet is transported along a second conveying surface to the same stacking area, in the stacking area the wafer cover sheet is supplied to the coated side of the wafer base sheet and placed flat thereon and then the wafer base sheet and the wafer cover sheet are removed jointly.

Such apparatuses have been known for a fairly long time and are used in various embodiments.

For example, apparatuses and methods are known in which wafer sheets, in particular crispy brittle flat wafers, are baked in tong automatic baking machines where the wafer sheets are baked at high pressure in closed and locked wafer tongs and then cooled. The wafer sheets are preferably thin-walled crispy brittle wafers having a size of up to 400×800 mm. Flat wafers are for example used to form wafer finger blocks which have a layered structure, for example, comprising alternate layers of wafer sheets and cream fillings. Wafer finger blocks can, for example, consist of two wafer sheets with an interposed cream layer, of two wafer sheets with a plurality of interposed cream layers but also can consist of a structure of more than two wafer sheet layers, where in each case one or more cream layers are disposed between two wafer sheets. In most cases the wafer finger blocks have respectively one wafer sheet on the two exterior surfaces. The terminating layers are therefore designed as wafer sheets.

For this purpose a wafer base sheet is transported on a conveying surface to a coating machine. The coating machine applies a layer of a coating mass, for example, a cream, and transports the coated wafer base sheet further. Parallel to this, flat wafers are removed from the wafer baking oven, which are transported along a second conveying surface but not coated. A so-called sandwich former is used for combining the wafer cover sheet and the coated wafer base sheet. For this purpose, sandwich formers corresponding to the prior art stop the base sheet at a stop, supply the wafer cover sheet in this rest position and place it flat on the cream layer or on the coated side of the wafer base sheet. As a result of the consistency of the cream, the wafer cover sheet adheres to the cream and subsequently to the wafer base sheet. The stop is then removed and the finished sandwich consisting of a wafer cover sheet, a cream layer and a wafer base sheet can be transported further.

A disadvantage with this design is that the wafer flow cannot be conveyed continuously but must be stopped briefly for joining and stacking the wafer sheets. Modern wafer baking ovens convey up to 80 wafer sheets per minute. In particular, when combining two wafer baking ovens which produce wafer sheets in parallel, it is accordingly necessary to provide a sandwich forming device which can process a high throughput. Due to the delay caused by the braking and restarting of the individual wafer sheets, sandwich formers corresponding to the prior art are restricted in their conveying capacity. This results from the fact that the crispy brittle wafers cannot be accelerated and retarded arbitrarily sharply since the wafer sheets could not withstand the higher acceleration forces due to the low mechanical resistance. The result of a too-severe acceleration would be broken wafers which must be discarded as rejects.

In order to minimise rejects, it is further necessary to keep the edge regions of the wafer blocks which have defects due to production tolerances as small as possible. For this reason it is important to place the wafer sheets, in particular the wafer base sheet and the wafer cover sheet as accurately as possible above one another. Wafer sheets which do not lie exactly congruently on one another but are slightly laterally displaced must be calibrated at the edge regions. This is accomplished by trimming the edge regions. Accordingly the more accurately the wafer sheets can be placed one above the other and the fewer defects the edges of the wafer sheets have as a result of any conveying and stop devices, the less they need to be trimmed and the fewer rejects are produced.

BRIEF SUMMARY OF THE INVENTION

It is now the object of the present invention to provide a method and an apparatus for producing multilayer wafer blocks filled with a coating mass, where a high throughput is achieved, at the same time the wafer sheets are positioned exactly above one another, the dimensional tolerances of the finished product are adhered to as exactly as possible, the wafer sheets are processed as gently as possible and where the apparatus is favourable to produce, favourable to maintain and easy to operate.

The object according to the invention is solved inter alia whereby the wafer cover sheet and the wafer base sheet in the stacking area are each moved at a speed which is non-zero at each time point. It is furthermore consistent with the inventive idea that the wafer cover sheet on contact with the coating mass of the wafer base sheet, and the wafer base sheet have substantially the same speed in the conveying direction, that the wafer cover sheet is stopped by a stopper mounted upstream of the stacking area in the conveying direction and is transported at the desired entry time by one or more transport devices along the second conveying surface in the direction of the stacking area and that the wafer cover sheet is transported by one or more positioning elements in the conveying direction in the direction of the stacking are, in particular is pushed. Furthermore, the invention is characterised in that the wafer base sheet is transported by a first transport device in the direction of the stacking area, wherein the transport speed of the first transport device in the conveying direction is lower than the transport speed of the positioning element, that the wafer base sheet is pushed by the positioning elements into the stacking area, that the wafer base sheet is transported along a first conveying surface and the wafer cover sheet is transported along a second conveying surface by the positioning elements into the stacking area and that the positioning elements grip behind the wafer cover sheet and behind the wafer base sheet and thereby centre the two wafer sheets above one another and push in the conveying direction. For solving the object according to the invention, the invention further relates to an apparatus for producing multilayer wafer blocks filled with a coating mass such as, for example, a cream, comprising a first conveying surface for transporting a wafer base sheet to the stacking area, a second conveying surface for transporting a wafer cover sheet to the stacking area, and at least one positioning element for the exact positioning of the wafer cover sheet above and/or on the wafer base sheet, wherein the positioning element is disposed movably in the conveying direction. The apparatus is positively characterised in that the positioning elements are movable at least in sections along the second conveying surface, that the positioning elements are movable at least in sections along the first conveying surface, that the positioning elements are driven by a belt running along a first contour and that the positioning elements are movable initially in the conveying direction along the second conveying surface and thereafter along the first conveying surface. Further features of the invention are that a run-in area is provided in which the first and the second conveying surface are configured to approach one another, that the positioning elements in the run-in area are movable along the second conveying surface and in the stacking area along the first conveying surface and that the positioning elements in the stacking area are disposed to run substantially normal to the first conveying surface. It can further be provided according to the invention that a fourth transport device is provided along the second conveying surface which is preferably configured as a belt conveyor, that a first transport device is provided along the first conveying surface which is preferably configured as a belt conveyor, that the first and the second conveying surface are combined in the stacking area, that separating elements running along the second conveying surface and disposed in the run-in area are provided, which are configured to run asymptotically or in a wedge shape in the direction of the first conveying surface. In addition, further features of the invention can be that openings are disposed between the separating elements, that the positioning elements have extensions which project in the run-in area through the openings disposed between the separating elements in the direction of the first conveying surface and that the wafer base sheet is transported by a first transport device in the direction of the stacking area, where the transport speed of the first transport device in the conveying direction is greater than the speed of the positioning element and that the wafer cover sheet is transported by a fourth transport device in the direction of the stacking area, where the transport speed of the fourth transport device in the conveying direction is greater than the speed of the positioning element and that both wafer sheets are pushed towards the positioning element, where the speed of the wafer sheets is determined by the speed of the positioning element.

The invention will be explained in detail in the following with reference to selected exemplary embodiments.

BRIEF DESCRIPTION OF THE SEVERAL VIEWS OF THE DRAWING

FIG. 4 is a diagrammatic, side view of a link of the apparatus for producing multilayer blocks according to the invention;

FIG. 5 is a diagrammatic, side view of the link from the opposite side; and

DESCRIPTION OF THE INVENTION

Figure 1:
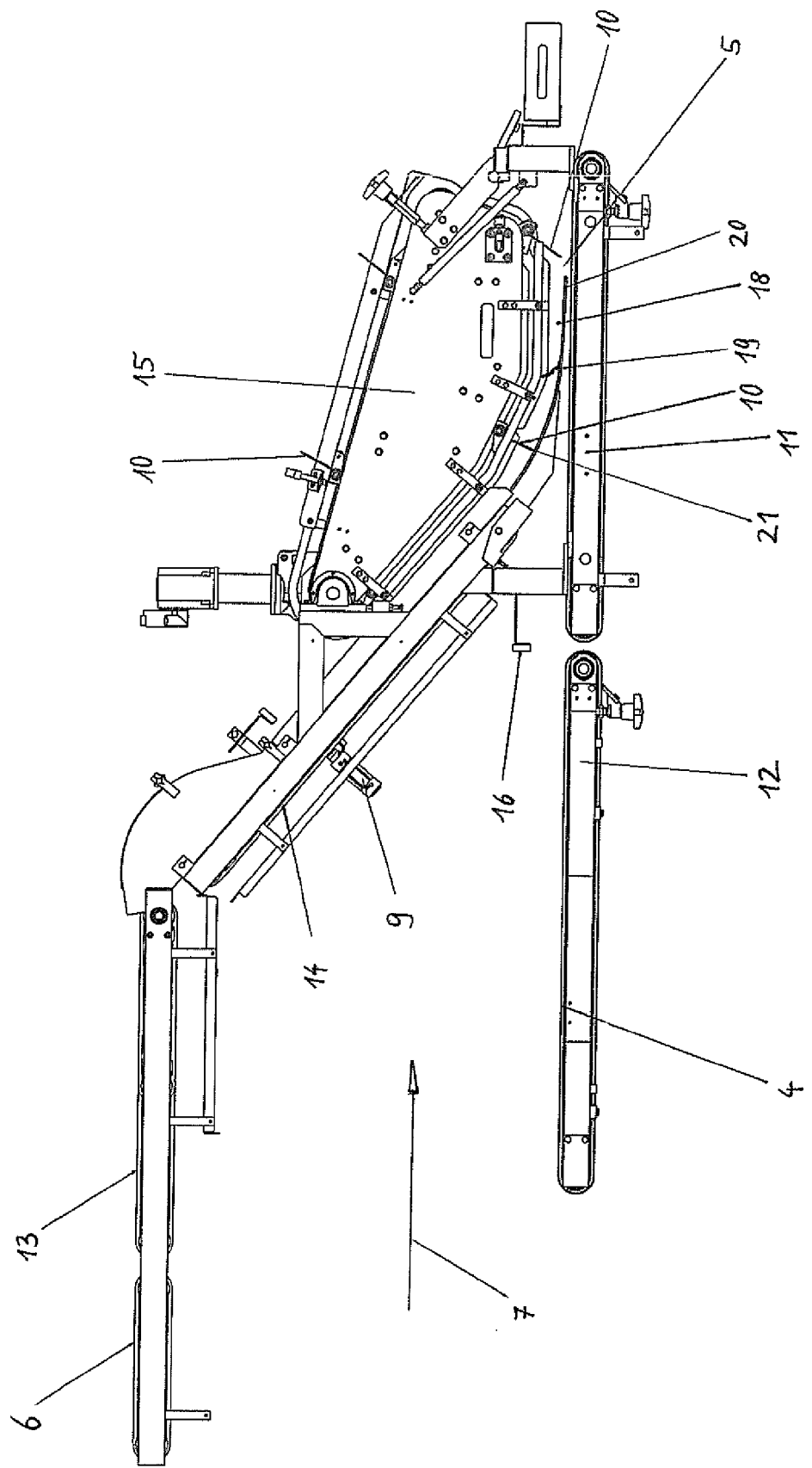
FIG. 1 is a diagrammatic, side view of an apparatus for producing multilayer blocks according to the invention.

FIG. 1 shows an apparatus according to the invention for producing multilayer wafer blocks filled with a coating mass such as, for example, a cream, comprising a first conveying surface 4 which in the present embodiment comprises a first transport device 11 and a second transport device 12. Furthermore there is provided a second conveying surface 6 which comprises a third transport device 13 and a fourth transport device 14. The second conveying surface comprises an elevated section running substantially parallel to the first conveying surface, a sloping section running substantially from the elevated section to the stacking area 5 and a run-in area 18 which approaches the first conveying surface running substantially asymptotically or in a wedge shape to the second conveying surface. Furthermore, a fifth transport device 15 is provided. This comprises positioning elements 10 which are disposed substantially movably along the second conveying surface. Further, a detector 16 is provided in the region of the first conveying surface 4. This detects the time of entry of a wafer sheet, in particular of the wafer base sheet 2, into the apparatus according to the invention and/or to the first transport device 11. A stopper 9 is provided in the area of the second conveying surface 6. This comprises a retaining element such as, for example, a brush which hinders the further movement of a wafer sheet, in particular a wafer cover sheet 3. The stopper can be actuated by a signal coming from a control unit 17. The retaining element is thereby moved and the movement of the wafer sheet released. Subsequently the wafer sheet is then conveyed further in the direction of the stacking area 5.

Typically wafers coming from a wafer baking oven are transferred to a cooling device. The wafers are subsequently supplied to the first conveying surface 4 and the second conveying surface 6. A device is provided along the first conveying surface 4 which applies a layer consisting of a coating mass, a cream or similar to wafer sheets which are conveyed past. Examples of such devices are contact coating devices in which viscous masses or a cream is applied by means of a roller device, film application devices or also pressure head devices in which the cream is sprayed on via nozzle heads. In order to make the application of the coating mass as efficient as possible, the application is carried out continuously. In order to minimise wastage here, the individual wafer sheets are arranged flat edge to edge. This substantially continuous band of coated wafer sheets which will subsequently be designated as wafer base sheets 2 is transferred via the second transport device 12 to the first transport device 11. In this case, the first transport device 11 has a higher transport speed than the second transport device 12. As a result, the individual wafer sheets are pulled apart and transported spaced apart from one another along the first conveying surface in the direction of the stacking area 5.

Parallel to this, uncoated wafer sheets which are subsequently designated as wafer cover sheets 3 are transported along the second conveying surface 6 in the conveying direction 7. In this case, the wafer cover sheets 3 are transferred from a third transport device 13 to a fourth transport device 14. As mentioned initially, this has a stopper 9. At a certain time, the stopper opens, with the result that the wafer cover sheet 3 is conveyed further in the direction of the stacking area 8. Here the wafer sheet impacts against the nearest positioning element 10 which is moved along the second conveying surface 6. However, the movement of the positioning element 10 is slower than the transport speed of the wafer cover sheet with the result that the sheet is stopped by the positioning element. If the wafer sheet is now in contact with the rear side of the positioning element 10, the speed of the wafer cover sheet is determined by the speed of the positioning element. The positioning element 10 is accordingly disposed upstream of the wafer sheet in the conveying direction and retards the wafer sheet.

The positioning elements are guided and driven circumferentially by a fifth transport device 15. The fifth transport device 15 has a plurality of positioning elements 10. During further movement of the wafer cover sheet 3 along the second conveying surface 6, the positioning elements 10 located along a belt also move further, with the result that after a certain distance a second positioning element follows behind the wafer cover sheet in the conveying direction. This is preferably disposed at a distance from the wafer sheet and moves at the same speed as the front positioning element. If the wafer sheet is conveyed further into the run-in region 18, it comes in contact with a braking element 19. This brakes the movement of the wafer sheet and consequently brings about a change of stop of the front edge of the wafer sheet on the front positioning element to a stop with the rear edge of the wafer cover sheet at the rear following positioning element in the conveying direction. Now the wafer cover sheet is pushed by the fifth transport device 15, in particular by the positioning element 10 which follows the wafer sheet.

At the same time, a coated wafer base sheet is conveyed along the first conveying surface 4. This has a layer of a coating mass which in the present configuration points upwards, i.e. in the direction of the second conveying surface 6. On the underside the wafer base sheet 2 has no coating mass layer and thus lies directly on the first transport device 11. The two wafer sheets (wafer base sheet 2 and wafer cover sheet 3) are transported in such a manner that they are supplied to the run-in area 18 and the stacking area 5 approximately at the same time. The synchronisation of the speeds or the positions on the respective transport device is accomplished by the detector 16 and the stopper 9. If the wafer base sheet 2 is located in the run-in area 18, the wafer cover sheet 3 lying thereabove is pushed by the positioning elements 10 of the fifth transport device. Separating elements 20 are provided in the run-in area which extend in a finger shape or in a strip shape running along the second conveying surface in the direction of the first conveying surface. The fingers have intermediate spaces which extend substantially along the conveying direction. The positioning elements 10 pushing the wafer cover sheet 3 have extensions 21 which are guided through between the separating elements 20 and during movement also move the wafer base sheet 2. This movement is also accomplished as a pushing movement in which the extensions 21 of the positioning elements 10 are in contact with the rear edge of the wafer base sheet 2 and push the wafer base sheet in the direction of the stacking area 5. In the run-in area the positioning elements are moved in such a manner that the wafer base sheet 2 and the wafer cover sheet 3 are pushed by a substantially perpendicular edge or perpendicular surface. As a result of this perpendicular straight guidance of the positioning elements 10, the two moving wafer sheets 2, 3 are centered and positioned exactly above one another. The separating elements 20 end at the end of the run-in area 18. The two superposed wafer sheets are no longer separated by the separating elements 20 during conveyance into the stacking area 15 and thus lie one on top of the other. The approach of the two sheets is accomplished on the one hand by the force of gravity and/or on the other hand by the wedge-shaped convergence of the first conveying surface 4 and the second conveying surface 6. The sheets now lying one on top of the other form a wafer block which is formed from two wafer sheets with an interposed layer of a coating mass.

Figure 2:
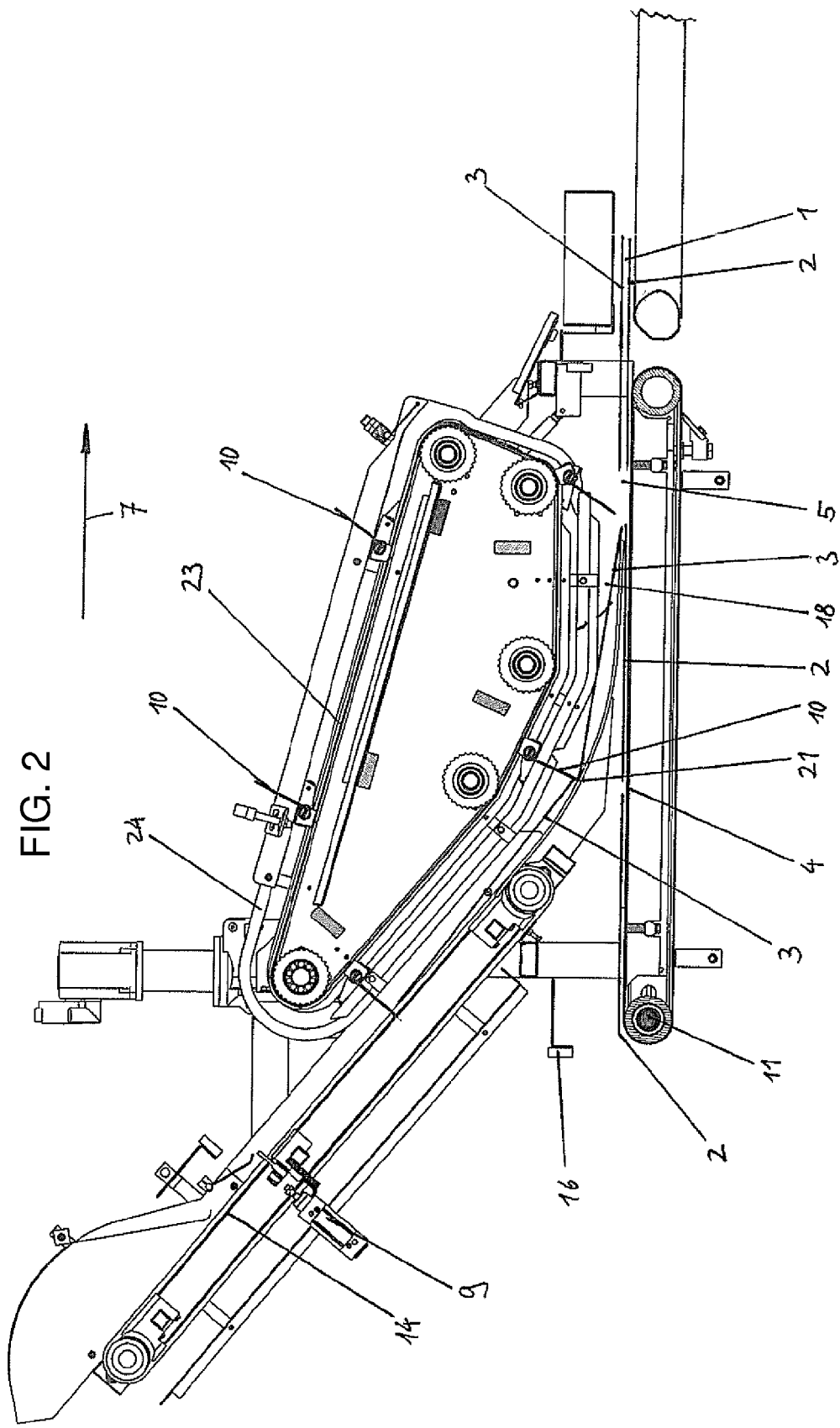
FIG. 2 is a diagrammatic, side view of a second embodiment of the apparatus for producing multilayer blocks according to the invention.

FIG. 2 shows a similar configuration to FIG. 1 in which again a first transport device 11 is provided. This can be configured, for example, as a conveyor roller arrangement, belt or band conveyor. Also provided is the fourth transport device 14 in the course of which the stopper 9 is provided. The stopper 9 in the same way as the detector 16 is connected to a control unit 17 not shown and is used to synchronise the two incoming wafer sheets which should be supplied substantially temporally in parallel to the stacking area 5. The positioning elements 10 are driven by a belt 23 and guided by a link 24. The link controls the position of the positioning elements in various regions relative to the conveying surfaces and to the wafer sheets. In particular in the run-in area 18 the positioning elements are guided in such a manner that the wafer base sheet 2 and the wafer cover sheet 3 are moved exactly above one another. The individual wafer sheets 2, 3 and subsequently the combined wafer block 1 are pushed in the run-in area 18 and at the beginning of the stacking area 5. This has the result that the positioning element 10 presses onto the rear edge of the wafer sheets. After or during the formation of the wafer block from the two wafer sheets 2, 3, the positioning element 10 is withdrawn from the link control and thus loses contact with the wafer block. The wafer block itself is on the one hand conveyed further by inertia and on the other hand by the first transport device and a transport device located downstream of the first transport device. Subsequently the withdrawn positioning element is guided away substantially upwards via a deflecting roller in order to be guided to the second conveying surface again following the belt.

This withdrawal or backward folding of the positioning element is necessary since the rear edge of the wafer block is thereby protected from damage.

Figure 3:
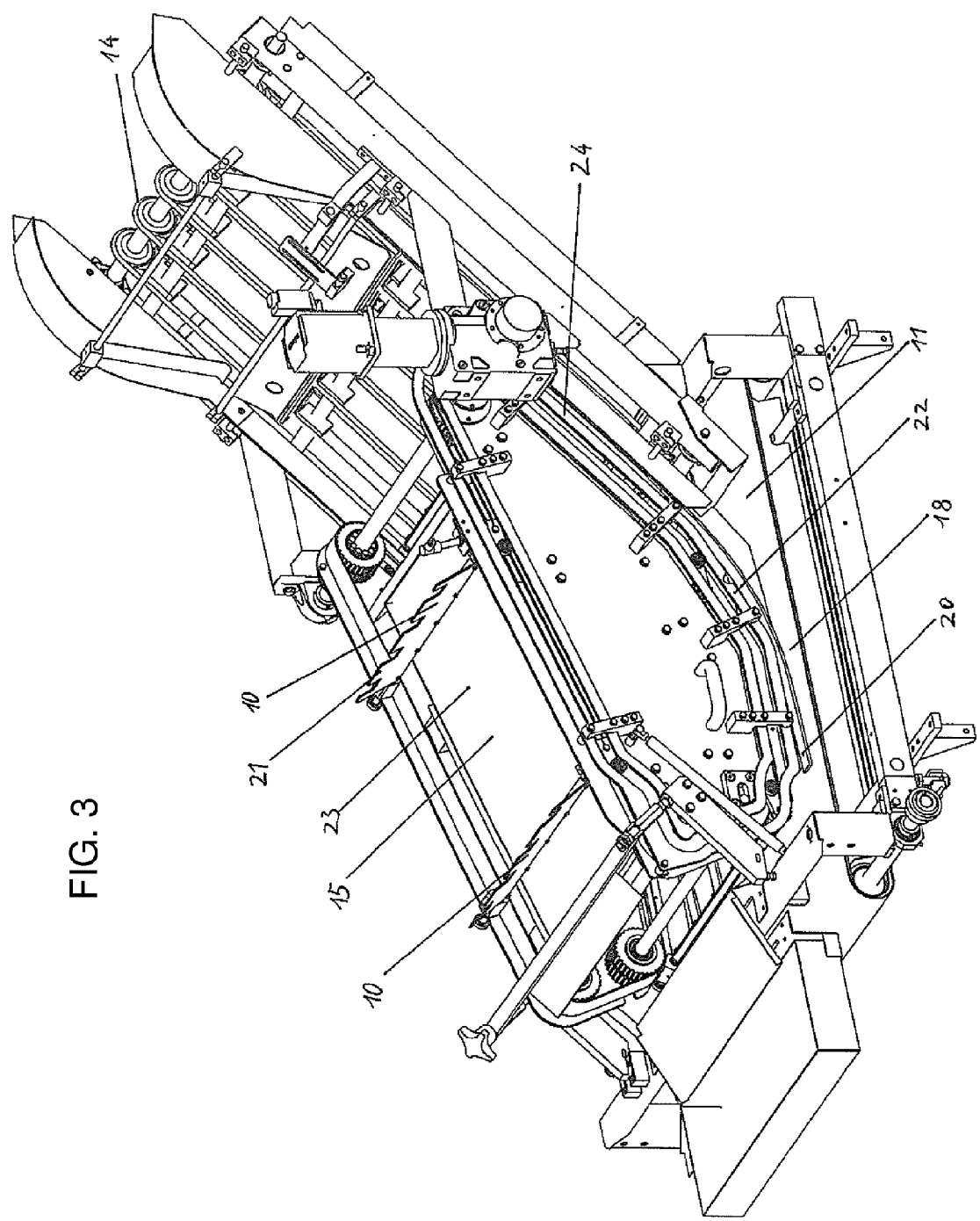
FIG. 3 is a diagrammatic, perspective view of a part of the apparatus for producing multilayer blocks according to the invention.

FIG. 3 shows an oblique view of a part of the apparatus according to the invention. Shown again are the first transport device 11, the fourth transport device 14 and the fifth transport device 15. This in turn has positioning elements 10 which are moved along a belt 23. The positioning elements 10 further have extensions 21 which in the run-in area 18 grip through the openings 22 between the separating elements 20. The separating elements 20 run substantially in a strip shape along the conveying direction and along the second conveying surface 6. Furthermore, the link 24 is provided for controlling the movement of the positioning elements 10.

FIG. 4 shows a detailed view of the guidance of the positioning elements 10 in the rigidly disposed link 24 with respect to the machine frame. The positioning elements 10 each have a cam 25 and a guide element 26. The movement of the individual elements is accomplished by a driven belt or a driven band 23. The guide element 26 is guided along this band 23 following the first contour 27.

The respective positioning element is disposed rotatably on the guide element 26. Further, the cam 25 which scans the second contour 28 is rigidly connected to the positioning element. During the movement of the positioning element 10 along the first contour 27, the cam 25 now leaves the second contour 28. Since the first contour and the second contour do not run parallel in all areas, a rotation of the positioning elements 10 with respect to the band 23 or the first contour 27 occurs. In the present form, the cam 25 is designed as a lever which has a roller 31 on the side located far from the connection to the positioning element 10. This roller 31 engages in the leading form 29 which is configured to follow the second contour 28. The lever is rigidly connected to the positioning element 10 and is disposed rotatably about the axis of rotation 30.

FIG. 5 shows the same link but viewed from the other side. The positioning elements 10, the cams 25, the guide elements 26, the first contour 27, the second contour 28, the leading form 29, the axes of rotation 30 and the roller 31 can again be seen.

Figure 6:
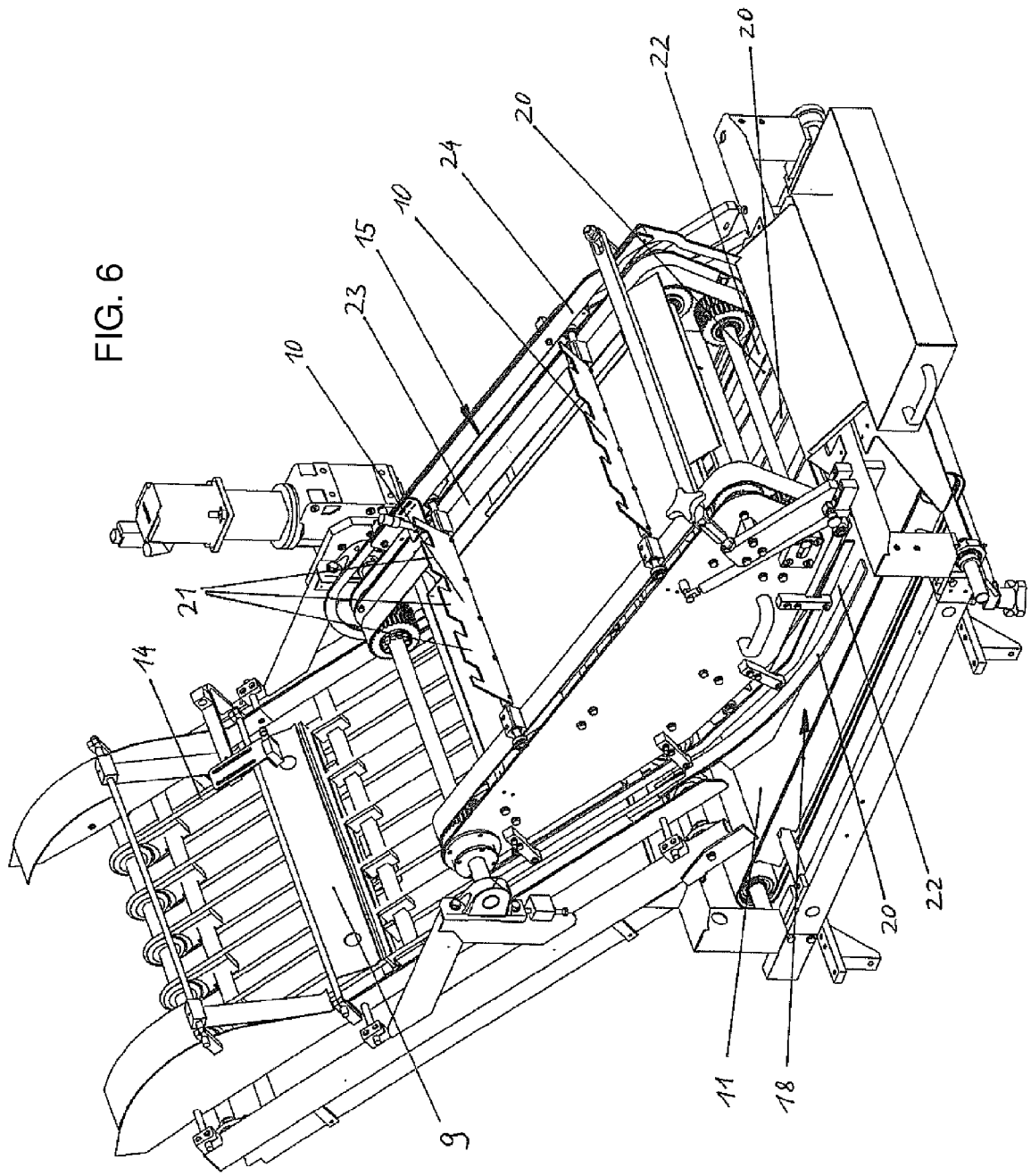
FIG. 6 is a diagrammatic, perspective view of a third embodiment of the apparatus for producing multilayer blocks according to the invention.

FIG. 6 shows an oblique view of one embodiment of the present apparatus according to the invention. The view shows the opposite side of the arrangement to that shown in FIG. 3. The stopper 9, the positioning elements 10, a first transport device 11, a fourth transport device 14, a fifth transport device 15, the run-in area 18 with the strip-shaped separating elements 20 and the openings 22 disposed between the separating elements 20 are again shown. The separating elements 20 here have free ends which point in the direction of the stacking area 5. The openings 22 are open in the direction of the stacking area 5. The extensions of the positioning elements 10 move, guided by the link 24 and driven by the band 23, at least partially along the second conveying surface 6. The extensions 21 thereby engage in the openings 22 of the separating elements 20 and close them off similarly to a comb. To this end the extensions 21 project at least partially through the openings 22 in the direction of the first conveying surface 4. Due to the projecting regions, the positioning elements 10 can also move the wafer base sheet transported on the first conveying surface. The bands 23 in this embodiment are designed as toothed belts, driven by a drive and deflected by a plurality of deflecting rollers. The band 23 is designed to be circumferentially closed. Furthermore, the fourth transport device 14 and the first transport device 11 comprise closed strip-shaped movement means. These are also driven and deflected around deflecting rollers.

As noted in the description to FIGS. 1 to 6, the apparatus according to the invention is adapted to place wafer sheets continuously on one another in order to thus form wafer blocks. For this purpose a plurality of wafer sheets are supplied one after the other, via a first conveying surface 4 and a second conveying surface 6 to the stacking area 5. Apart from some short interruption of the movement by the stopper 9 along the second conveying surface 6 which serves to exactly synchronise the two wafer sheets to the combined, both the wafer cover sheet and the wafer base sheet are moved continuously. In particular the bringing together and the exact placement of the two wafer block components one on top of the other takes place in a continuous moving process. In order to improve the accuracy of fit of the two sheets to be placed one on top of the other, positioning elements 10 are provided. In the embodiments described these positioning elements 10 push a pair comprising a wafer cover sheet and a wafer base sheet and thus act as a co-moving pushing stop.

It is however completely consistent with the inventive idea that the positioning elements 10 in the stacking area 5 do not have a pushing but a braking effect. In this case, the speed of the positioning elements 10 is lower than the conveying speed of the two wafer sheets. In the run-in area 18 and moreover in the stacking area 5, according to this embodiment not shown the wafer cover sheet and the wafer base sheet are pushed by the transport devices onto the moving stop, i.e. the positioning element 10. Since the speed of the positioning element is lower, both sheets arrive with the front edge at the positioning elements 10. The transport devices thus have a slippage with respect to the respective wafer sheets. In particular for conveyance of the wafer base sheet, the first transport device 11 is adapted to the positioning element 10 serving as a stop. In particular the fourth transport device 14 is provided for conveyance of the wafer cover sheet to the positioning element 10. In the embodiment just described but not shown, the braking element 19 is omitted.

The braking element 19 in FIG. 1 and FIG. 2 is designed as a resiliently pre-stressed element which is pre-stressed with a certain spring force against at least one separating element 20. If a wafer sheet is now pushed between the braking element and the separating element, the sheet is braked due to the friction. Other possibilities for braking the wafer sheet are braked rollers, rolls, friction surfaces etc.

The apparatus according to the invention and the method according to the invention enable the continuous combining and forming of wafer blocks at very high throughput. Thus, for example, up to 100 or more wafer blocks per minute can be formed. As a result of the continuous formation of the wafer blocks and the further advantages of the apparatus according to the invention, the quality achieved and the associated wastage is furthermore optimised.

At this point, it should be noted that the invention is not restricted to the exemplary embodiments listed. Further embodiments corresponding to the inventive idea are obtained from combinations of individual or several features which can be deduced from the entire description, the figures and/or the claims. Consequently embodiments are also disclosed which consist of combinations of features stemming from different exemplary embodiments. The figures are at least partially schematic views where the dimensions and proportions can deviation from other embodiment or features not depicted in the drawings and from real embodiments.

REFERENCE LIST

1 Wafer block
2 Wafer base sheet
3 Wafer cover sheet
4 First conveying surface
5 Stacking area
6 Second conveying surface
7 Conveying direction
8
9 Stopper
10 Positioning element
11 First transport device
12 Second transport device
13 Third transport device
14 Fourth transport device
15 Fifth transport device
16 Detector
17 Control unit
18 Run-in area
19 Braking element
20 Separating element
21 Extensions (of the positioning elements)
22 Openings (separating elements)
23 Band (positioning elements)
24 Link
25 Cam
26 Guide element
27 First contour
28 Second contour
29 Leading form
30 Axis of rotation of cam
31 Roller

The invention claimed is:

1. A method for producing multi-layer wafer blocks filled with a coating mass, which comprises the steps of:
   providing an apparatus for producing multilayer wafer blocks filled with a coating mass including:
   a stacking area;
   a first conveying surface for transporting a wafer base sheet to the stacking area;
   a second conveying surface for transporting a wafer cover sheet to the stacking area;
   at least one positioning element for an exact positioning of the wafer cover sheet at least one above or on the wafer base sheet, the at least one positioning element configured to grip behind the wafer cover sheet and behind the wafer base sheet to center the wafer base sheet and wafer cover sheet above one another and push in the conveying direction, the at least one positioning element disposed movably in a conveying direction;

a run-in area in which the first and the second conveying surface are configured to approach one another;

separating elements running along the second conveying surface and disposed in the run-in area, the separating elements run asymptotically or in a wedge shape in a direction of the first conveying surface;

the at least one positioning element having extensions projecting in the run-in area in the direction of the first conveying surface through openings disposed between the separating elements;

transporting a wafer base sheet coated with the coating mass along the first conveying surface to the stacking area;

transporting a wafer cover sheet along the second conveying surface to the stacking area;

supplying the wafer cover sheet to a coated side of the wafer base sheet and placed flat thereon, in the stacking area;

removing jointly the wafer base sheet and the wafer cover sheet;

moving each of the wafer cover sheet and the wafer base sheet in the stacking area at a speed which is non-zero at each time point;

transporting the wafer cover sheet by the at least one positioning element in a conveying direction in a direction of the stacking area; and pushing the wafer base sheet by the at least one positioning element into the stacking area, the at least one positioning element grips behind the wafer cover sheet and behind the wafer base sheet and thereby centers the wafer base and cover sheets above one another and pushes in the conveying direction.

2. The method according to claim 1, wherein the wafer cover sheet on contact with the coating mass of the wafer base sheet, and the wafer base sheet have substantially a same speed in the conveying direction.

3. The method according to claim 1, which further comprises stopping the wafer cover sheet via a stopper mounted upstream of the stacking area in the conveying direction and the wafer cover sheet is transported at a desired entry time by at least one transport device along a second conveying surface in the direction of the stacking area.

4. The method according to claim 1, which further comprises transporting the wafer base sheet by a first transport device in a direction of the stacking area, wherein a transport speed of the first transport device in the conveying direction is lower than a transport speed of the at least one positioning element.

5. The method according to claim 1, which further comprises transporting the wafer base sheet along the first conveying surface and the wafer cover sheet along the second conveying surface by the at least one positioning element into the stacking area.

6. The method according to claim 1, which further comprises transporting the wafer cover sheet by pushing the wafer cover sheet via the at least one positioning element in the conveying direction in the direction of the stacking area.

7. An apparatus for producing multilayer wafer blocks filled with a coating mass, the apparatus comprising:

a stacking area;

a first conveying surface for transporting a wafer base sheet to said stacking area;

a second conveying surface for transporting a wafer cover sheet to said stacking area;

at least one positioning element for an exact positioning of the wafer cover sheet at least one above or on the wafer base sheet, said at least one positioning element configured to grip behind the wafer cover sheet and behind the wafer base sheet to center the wafer base sheet and wafer cover sheet above one another and push in the conveying direction, said at least one positioning element disposed movably in a conveying direction;

a run-in area in which said first and said second conveying surface are configured to approach one another;

separating elements running along said second conveying surface and disposed in said run-in area, said separating elements run asymptotically or in a wedge shape in a direction of said first conveying surface; and said at least one positioning element having extensions projecting in said run-in area in the direction of said first conveying surface through openings disposed between said separating elements.

8. The apparatus according to claim 7, wherein said at least one positioning element is one of a plurality of positioning elements movable at least in sections along said second conveying surface.

9. The apparatus according to claim 7, wherein said at least one positioning element is movable at least in sections along said first conveying surface.

10. The apparatus according to claim 7, further comprising:

a first contour; and a belt, said at least one positioning element is driven by said belt running along said first contour.

11. The apparatus according to claim 7, wherein said at least one positioning element is one of a plurality of positioning elements movable initially in the conveying direction along said second conveying surface and thereafter along said first conveying surface.

12. The apparatus according to claim 7, wherein said at least one positioning element is one of a plurality of positioning elements and said plurality of positioning elements in said run-in area are movable along said second conveying surface and in said stacking area along said first conveying surface.

13. The apparatus according to claim 7, wherein said at least one positioning element is one of a plurality of positioning elements and said plurality of positioning elements in said stacking area are disposed to run substantially normal to said first conveying surface.

14. The apparatus according to claim 7, further comprising a transport device disposed along said second conveying surface and is a round belt conveyor.

15. The apparatus according to claim 7, further comprising a transport device disposed along said first conveying surface and is a flat belt conveyor.

16. The apparatus according to claim 7, wherein said first conveying surface and said second conveying surface are combined in said stacking area.

* * * * *